United States Patent [19]

Alexander, Jr. et al.

[11] Patent Number: 5,336,286
[45] Date of Patent: Aug. 9, 1994

[54] HIGH EFFICIENCY AIR FILTRATION MEDIA

[75] Inventors: Paul R. Alexander, Jr.; Donald G. Cain; Erika J. Dougherty, all of Charlotte, N.C.; Theodore S. Thornburg, Rock Hill, S.C.

[73] Assignee: Hoechst Celanese Corporation, Somerville, N.J.

[21] Appl. No.: 53,029

[22] Filed: Apr. 26, 1993

[51] Int. Cl.$^5$ .............................................. B01D 29/03
[52] U.S. Cl. ................................... 55/528; 55/DIG. 5
[58] Field of Search .................................. 55/527, 528

[56] References Cited

U.S. PATENT DOCUMENTS

| | | | |
|---|---|---|---|
| 2,923,653 | 2/1960 | Matlin et al. | 55/528 X |
| 3,154,393 | 10/1964 | Klein et al. | 55/528 X |
| 3,616,183 | 10/1971 | Brayford et al. | 161/175 |
| 3,842,007 | 10/1974 | Capati et al. | 210/65 |
| 3,998,988 | 12/1976 | Shimomai et al. | 428/400 |
| 4,047,862 | 9/1977 | Keith | 425/8 |
| 4,160,059 | 7/1979 | Samejima | 428/288 |
| 4,192,838 | 3/1980 | Keith et al. | 264/10 |
| 4,274,914 | 6/1981 | Keith et al. | 162/109 |
| 4,286,977 | 9/1981 | Klein | 55/528 X |
| 4,540,625 | 9/1985 | Sherwood | 55/527 X |
| 4,565,727 | 1/1986 | Giglia et al. | 55/528 X |
| 4,589,894 | 5/1986 | Gin et al. | 55/528 X |
| 4,765,812 | 8/1988 | Homonoff et al. | 55/528 X |
| 4,840,838 | 6/1989 | Wyss | 55/528 X |
| 4,904,343 | 2/1990 | Giglia et al. | 55/528 X |
| 4,917,714 | 4/1990 | Kinsley, Jr. | 55/528 X |
| 4,983,193 | 1/1991 | Tani et al. | 55/528 X |
| 5,022,964 | 6/1991 | Crane et al. | 162/146 |

FOREIGN PATENT DOCUMENTS 2220428 1/1990 United Kingdom ................ 55/528

OTHER PUBLICATIONS

Method For Sodium Chloride Particulate Test For Respirator Filters, Mar./1972, British Standards Institution, London.
Method of Testing Air-Cleaning Devices Used in General Ventilation For Removing Particulate Matter, Feb. 1976, American Society of Heating, Refrigerating And Air-Conditioning, Inc., Atlanta, Ga.
Product Bulletin, AAF Varicel, American Air Filter, Louisville, Ky, 8 pages, undated.

*Primary Examiner*—Robert E. Spitzer
*Attorney, Agent, or Firm*—R. H. Hammer, III

[57] ABSTRACT

A high efficiency air filtration media comprises: about 5 to about 20% by weight of fibrids; about 5 to about 20% by weight of a binder; and about 60 to about 90% by weight of staple fiber. The media has a pressure drop of air across a face of the media of less than or equal to 0.4 inches of water. The media, also, has a sodium chloride particulate test for respirator filter percent efficiency of greater than or equal to 60%.

7 Claims, No Drawings

HIGH EFFICIENCY AIR FILTRATION MEDIA

FIELD OF THE INVENTION

This invention is directed to a filter media, particularly a high efficiency air filtration media being substantially free of glass fibers or glass microfibers.

BACKGROUND

High efficiency air filtration media is used in commercial and industrial air cleaning equipment. An example of such media is the "VARICEL ®" air filter marketed by American Air Filter Co., of Louisville, Ky. These filters provide excellent particulate matter removal from the air that passes through them without sacrificing pressure drop. These types of filter, however, are made with glass fibers or glass microfibers (referred to hereinafter as "glass fibers"). These glass fibers are suspected of being cancer causing agents and the air filtration industry is looking at ways of eliminating the use of glass fibers in air filtration media. See: "Cancer Risk Cited in Three Man-Made Fibers", Washington Post, Jun. 27, 1987, p. f04; "Cancer Puts Fiberglass Under the Microscope", Wall Street Journal, Eastern (Princeton, N.J.) Edition, Jun. 17, 1991, page B1; Kilburn, K. H., et al., "Difficulties of Attribution of Effects in Workers Exposed to Fiberglass and Asbestos", The American Journal of Industrial Medicine, Vol. 20, No. 6, (1991) pps. 745–751; "Fiberglass Not Carcinogenic, OSHA Says", Environmental News Networks Inc., Global Warming Network-GWN Online Today, Jul. 26, 1991; and Saracci, R., "Ten Years of Epidemiologic Investigations On Man-Made Mineral Fibers and Health", Scandinavian Journal of Work Environment and Health, 12 Supplement No. 1, (1986) pps. 5–11.

Attempts to replace glass fiber-based air filtration media with melt-blown fabrics have met limited success. While these melt-blown fabrics can provide high particulate matter removal efficiencies, they suffer by being light-weight, weak, and limp. Such materials produce structurally deficient filters. Accordingly, the use of melt-blown fabrics, at this time, does not appear to be a viable option.

Finally, filter media utilizing various combinations of staple fibers, fibrids, and heterofils are known. See, for example, U.S. Pat. Nos. 4,160,059; 4,274,914; 5,022,964; and pending U.S. patent application Ser. No. 07/999,031, filed Dec. 31, 1992, each of which is incorporated herein by reference. U.S. Pat. No. 4,160,059 is directed to nonwoven fabric produced by a dry process consisting essentially of: (1) supporting fibers which consist of (a) natural and/or synthetic fibers and (b) heat fusible fibers; and (2) an adsorptive material. U.S. Pat. No. 4,274,914 is directed to a filter sheet comprising cellulose ester staple fibers, cellulose ester fibrids, and excluding any binder. U.S. Pat. No. 5,022,964 is directed to a nonwoven fibrous web that contains cellulose ester fibers, cellulose ester fibrids, and a minor amount of activated fusible fibers (binder fibers). U.S. application Ser. No. 07/999,031 filed Dec. 31, 1992 is directed to a wet-laid filter structure comprising bicomponent fibers (heterofils) and may include microfibers.

SUMMARY OF THE INVENTION

A high efficiency air filtration media comprises: about 5 to about 20% by weight of fibrids; about 5 to about 20% by weight of a binder; and about 60 to about 90% by weight of staple fiber. The media has a pressure drop of air across a face of the media of less than or equal to 0.4 inches of water. The media, also, has a sodium chloride particulate test for respirator filter percent efficiency of greater than or equal to 60%.

DETAILED DESCRIPTION OF THE INVENTION

The term "high efficiency air filtration media", as used herein, refers to media used in air cleaning equipment which is generally considered to be included within the ASHRAE Standard Method of Testing "Air-Cleaning Devices Used In General Ventilation For Removing Particular Matter" (ASHRAE No. 52-76) by ASHRAE Standard Committee, February 1976. These types of filter media are typically used in air cleaning equipment associated with heating, ventilation, and air-conditioning equipment (HVAC). Moreover, these type of high efficiency filtration media are typically used in industrial or commercial applications.

The term "substantially free of glass fibers", as used herein, refers to a most preferred embodiment in which no glass fibers nor glass microfibers are added to the filtration media's formulation. Minor amounts of such glass fibers or glass microfibers maybe added, so long as they do not pose a significant health risk.

The term "fibrid" as used herein, refers to a microfiber or pulp-like material that has a high surface area per volume ratio. Examples of this material include cellulose ester fibrids, polyester fibrids, and acrylic fibrids and combinations thereof. Specific examples of each of the foregoing materials are: cellulose ester fibrids—"Fibrets", made of cellulose acetate, and commercially available from the Hoechst Celanese Corporation, Charlotte, N.C.; polyester fibrid—a developmental fibrillated PET (polyethylene terephthalate) fiber provided by the Hoechst Celanese Corporation of Charlotte, N.C.; and acrylic fibrids—CFF Fibrillated Acrylic Fiber provided by American Cyanamid Company of Wayne, N.J. These materials generally have a surface area in excess 5.0 square meters per gram, lengths less than 1000 microns, and diameters of from about 0.5 to 50 microns. With regard to the "Fibret" material, see U.S. Pat. Nos. 3,842,007; 4,047,862; 4,192,838, each is incorporated herein by reference. The "Fibret" material is preferred. The fibrids comprise about 5 to about 20% by weight of the media, the upper limit is chosen because above that limit no additional performance benefits were observed. Preferably, the fibrids comprise about 5% to about 10% by weight of the media.

The term "binder", as used herein, refers to heterofils, binder fibers, or binder resins, or combinations thereof which bond the components of the media into a cohesive structure. Heterofils and binder resins are preferred. Heterofils (also known as: bicomponent fibers, conjugate fibers, composite fibers, or heterofilaments) are fibers comprising at least two discrete components (i.e., sheath/core or side-by-side). Heterofilaments are known in the art (e.g., see U.S. Pat. Nos. 3,616,183 and 3,998,988, both are incorporated herein by reference). One of the components has a melting point lower than the other component, the low melting component is used as the "glue". A heterofil, e.g. "Celbond" brand heterofilament from Hoechst Celanese Corporation of Charlotte, N.C., is preferred. Binder fibers (also referred to as fusible fibers), also well known to those of ordinary skill (e.g., see U.S. Pat. No. 5,022,964, which is incorporated herein by reference. ), are fibers in which the entire fiber melts to form a point of bonding between other components of the media which do not melt. Resins, which can be used, include any type of latex emulsion. The material of choice is an acrylic latex emulsion such as GL618 resins by Rohm & Haas Company of Philadelphia, Pa. This material is a thermosetting polymer, which gives a tough bond between fibers after the filter media is dried with heat. Other acrylic resins may be used to impart a softer, tackier or stiffer feel to the filter media. Typical curing resins used with the acrylic latex are based upon melamine-formaldehyde, urea-formaldehyde, epoxy, or phenolic chemistry. The binder comprises about 5% to about 20% by weight of the media.

The term "staple fiber", as used herein, refers to short fibers. Typically, these fibers are made from a synthetic polymer. Such polymers include: polyester (e.g., polyethylene terephthalate); cellulose ester (e.g., cellulose acetate ); polyethylene; polypropylene; and nylon. The preferred polymer is polyethylene terephthalate. Staple fibers are generally in the size range of: about ⅛ to ¾ inch in length; and about 0.3 to 8 denier per filament. Preferably, the staple fibers are in the size range of: about ¼ to ½ inch in length; and about 0.3 to 1.5 denier per filament (dpf). The staple fiber comprises about 60% to about 90% by weight of the media. Preferably, the staple fiber comprises about 70% to about 90% of the media.

The particulate removal efficiency is expressed in terms of the "Sodium Chloride Particulate Test for Respirator Filter", discussed in greater detail in Example 1 below. Preferably, the sodium chloride particulate test (also referred to as the "Na Flame test") efficiency is greater than or equal to 60%. The pressure drop across the face of the filter is expressed in inches of water. The test procedure is discussed in greater detail in Example 1 below. Preferably, the pressure drop is less than or equal to 0.4 inches of water. The basis weight of the media is expressed in ounces per square yard. The basis weight, preferably, is within the range of about 2.5 ounces per square yard (87.5 gr/m$^2$) to about 5.0 ounces per square yard (175 gr/m$^2$).

Other details and aspects of the invention are more fully described in the examples set forth hereinafter. Weights are given as weight percent, unless otherwise noted.

EXAMPLE 1

The following examples, results set forth in Table 1, demonstrate the affect of various fibrid materials (acrylic fibrid, polyethylene fibrid, cellulose acetate fibrid, polyethylene terephthalate fibrid), and centrifugal-spun polyester upon the filter media. In Table 1, the identity and weight percent of fibrid is set forth along with the percent efficiency, based upon the "Sodium Chloride Particulate Test For Respirator Filters" (British Standards Institution, London, U.K.; BS 4400: 1969, March 1972 (AMD 918)), and pressure drop across the face of the media (inches of water). The pressure drop across the filter media sample is measured while the "Sodium Chloride Particulate Test for Respirator Filters" is run. The pressure drop test is run at a face velocity of 10.5 feet per minute. The pressure drop is measured using an oil filled manometer with pressure taps on the inlet side and outlet side of the filter media sample holder. Other components of the tested filter media include: 10% Celbond heterofil fiber (2 denier per filament, 0.5 inches in length) and polyethylene terephthalate staple (0.5 denier per filament, 0.25 inches in length).

These filter media examples were made using a wet lay handsheet maker. In each case the fibrid material was dispersed for several minutes in water using a kitchen type blender. The heterofil fiber and polyethylene terephthalate staple fiber were also dispersed in water using a blender. The two fiber slurries were then processed using a handsheet maker, which consists of a wet lay forming screen with a rectangular box above it. The screen was eight inches square. The box was filled with about 12 liters of water, and the fibrid and fiber slurries were added to the box. The slurries were then blended by hand for a few seconds and a drain underneath the screen was opened for the water to flow out. The fiber blend was thus deposited on the screen, forming a handsheet. The handsheet was then removed from the screen and dried. The amount of fiber/fibrid blend used to make each handsheet was 4 grams.

TABLE 1

| Fibrid | % Fibrid | % Efficiency, NA, Flame test | in. of Water pressure drop |
| --- | --- | --- | --- |
| CFF Acrylic | 5 | 76 | 0.05 |
|  | 10 | 71 | 0.05 |
|  | 20 | 71 | 0.04 |
|  | 30 | 75 | 0.05 |
|  | 60 | 72 | 0.09 |
| Fybrel Y-700 | 5 | 49 | 0.04 |
|  | 10 | 48 | 0.05 |
|  | 20 | 49 | 0.05 |
|  | 30 | 63 | 0.04 |
|  | 60 | 67 | 0.02 |
| CA Fibrets | 5 | 76 | 0.06 |
|  | 10 | 81 | 0.11 |
|  | 20 | 92 | 0.32 |
| PET Fibrets | 5 | 62 | 0.05 |
|  | 10 | 66 | 0.05 |
|  | 20 | 64 | 0.05 |
|  | 30 | 58 | 0.05 |
|  | 60 | 53 | 0.05 |
| Manville PET | 5 | 49 | 0.04 |
|  | 10 | 57 | 0.04 |
|  | 20 | 60 | 0.05 |
|  | 30 | 59 | 0.04 |
|  | 60 | 52 | 0.05 |

Note:
CFF Acrylic = American Cyanamid CFF
Fybrel Y-700 = Mitsui Polyethylene Snythetic Fibers
PET Fibrets = Developmental fibrillated PET fiber
Manville PET = Manville centrifugal - spun polyester

EXAMPLE 2

In the following example, the wet laid nonwoven production procedure for the manufacture of filter media is demonstrated. Results, relating the "Sodium Chloride Particulate Test For Respirator Filters" (see above), and pressure drop (see above) are set forth in Table 2. The procedure is as follows:

1. Overview

The high efficiency air filter media was developed using a pilot scale nonwovens line consisting of fiber dispersion tanks, an incline wire wet lay machine, and a through air drum dryer.

2. Fiber Dispersion

Fibrids were dispersed using a high shear device such as a rotor-stator type homogenizer (for example, a Silverson Model L4R or Ross Model ME100LX). Fibrids were added to water at from 0.1 to 1% by weight and mixed by the homogenizer for one to five minutes. The staple fibers were added to the stock tanks at 0.1% by weight in water and agitated for several minutes to achieve an even dispersion. The dispersed fibrid slurry was added to the stock tanks anytime after the staple fibers were added.

In the formulations using chemicals, Milease T (from ICI Americas Inc. of Wilmington, Del.) was added to disperse the polyester fibers and Nalco L2755 (from Nalco Chemical Co., of Naperville, Ill.) was added to disperse the Celbond fibers. Nalco 7588 (from Nalco Chemical Co. of Naperville, Ill.) was added to increase the viscosity of the fiber blend in order to prevent retangling of the staple fibers. Nalco 8669 (from Nalco Chemical Co. of Naperville, Ill.) was added in order to reduce foaming of the stock tank solution.

3. Web Formation

After the fibers were well dispersed, the wet laid machine (a Bruderhaus-type) was started up. The fiber slurry was pumped over to the headbox of the machine where it was diluted by 2 to 10 parts of water (white water). The machine wire passed under the headbox, but over a vacuum box which pulled the fiber slurry down onto the wire. Thus, the fiber slurry was transferred onto the wire and made into a web. In the formulations using a resin binder, the resin was applied as a water based emulsion by a saturation process. Resin was pumped into the saturator which overflowed onto the wet web as the web came out of the headbox.

4. Water Removal

The web was carried up out of the headbox and passed over several vacuum slots to draw out more water. The web then passed through a dryer which was a perforated drum with hot air passing through the perforations. The wet web was dried by the hot air passing through the web. The hot air, also, melted the sheath on the Celbond fibers, causing them to bind to other fibers. In the formulations containing a resin binder, the resin reacted from the heat in the dryer, forming a crosslinked polymer binder.

5. Alternative Equipment

Webs were also made using a rotoformer wet laid machine (a 33 inch extended wire rotoformer with a 19 inch table). The rotoformer is similar to the inclined wire machine, except the wire is rotated around a perforated drum through which the water is drawn to make the wet web.

Webs were also dried on heated rolls as an alternative to using the through air dryer. With the heated rolls the web contacted the rolls and the heat of the rolls was responsible for heating and evaporating the water in the web, and for activating the binder used in the web.

TABLE 2

| COMPOSITION OF FILTER MEDIA | | | % EFF. NA Flame | PRESS DROP, IN. H2O | Basis Weight, OZ/YD2 |
| --- | --- | --- | --- | --- | --- |
| STAPLE | BINDER | CA FIBRETS | | | |
| Preferred formulations | | | | | |
| 70% 0.5 dpf PET | 20% 2 dpf Celbond | 10% fibrets no chems | 80 | 0.15 | 2.7 |
| 90% 0.5 dpf PET | 5% GL 618 Resin | 5% fibrets chems | 70 | 0.10 | 3.0 |
| Alternative formulations | | | | | |
| 70% 0.3 dpf PET | 20% 2 dpf Celbond | 10% fibrets chems | 69 | 0.17 | 2.8 |
| 70% 1.3 dpf PET | 20% 2 dpf Celbond | 10% fibrets chems | 68 | 0.10 | 2.6 |
| 70% 0.5 dpf PET | 20% 2 dpf Celbond | 10% fibrets chems | 61 | 0.11 | 4.8 |
| 70% 1.3 dpf PET | 10% 2 dpf Celbond | 20% fibrets chems | 66 | 0.23 | 3.1 |
| 80% 0.5 dpf PET | 5% GL 618 Resin | 15% fibrets some chems | 88 | 0.37 | 2.9 |
| Comparative Results | | | | | |
| 78% 0.5 dpf PET | 20% 2 dpf Celbond | 2% fibrets | 35 | 0.04 | 2.6 |

Notes:
no chems = formulations made with no chemical dispersants
some chems = formulations made with no binder or fiber dispersants
chems = formulations made with staple dispersant, binder dispersant and viscosity modifier

EXAMPLE 3

In the following examples, the fibrous web disclosed in U.S. Pat. No. 5,022,964 was subjected to the "Sodium Chloride Particulate Test For Respirator Filters" (see Example 1) and the pressure drop across the face of the media (see Example 1). The results are set forth in Table 3.

TABLE 3

| Number of layers | % Efficiency Na Flame Test | Pressure Drop, inches water | Basis Weight, ounces/yd2 |
| --- | --- | --- | --- |
| 1 | 5 | 0.04 | 1.0 |
| 2 | 16 | 0.06 | 2.0 |
| 3 | 24 | 0.09 | 3.0 |
| 4 | 36 | 0.12 | 4.0 |
| 5 | 36 | 0.15 | 5.0 |

The present invention may be embodied in other specific forms without departing from the spirit or essential attributes thereof and, accordingly, reference should be made to the appended claims, rather than to the foregoing specification, as indicating the scope of the invention.

We claim:

1. A high efficiency air filtration media comprising:
   about 5 to about 20% by weight of fibrids;
   about 5 to about 20% by weight of binder;
   about 60 to about 90% by weight of staple fiber;
   said media being substantially free of glass fibers, having a pressure drop of air across a face of said media less than or equal to 0.4 inches of water at a face velocity of 10.5 feet per minute, a sodium chloride particulate test for respirator filter percent efficiency of greater than or equal to 60%, and a basis weight ranging from about 2.5 ounces per square yard to about 5.0 ounces per square yard.

2. The media according to claim 1 wherein said fibrids being selected from the group consisting of cellulose ester fibrids, acrylic fibrids, polyester fibrids, or combinations thereof.

3. The media according to claim 1 wherein said binder being selected from the group selected from the group consisting of binder resins, binder fibers, heterofils, or combinations thereof.

4. The media according to claim 1 wherein said staple fiber having a denier per filament ranging from about 0.3 to about 1.5.

5. The media according to claim 1 wherein said staple fiber having a length ranging from about ¼ inches to about ½ inches.

6. The media according to claim 1 wherein said media being substantially free of glass fibers.

7. A high efficiency air filtration media comprising:
   about 5 to about 10% of a cellulose ester fibrid;
   about 5 to about 20% of a binder selected from the group consisting of binder resins and heterofils;
   about 70 to about 90% of a polyester staple fiber; and
   said media being substantially free of glass fibers and having a pressure drop of air across a face of said media less than or equal to 0.4 inches of water at a face velocity of 10.5 feet per minute, a sodium chloride particulate test for respirator filter percent efficiency of greater than or equal to 60%, and a basis weight ranging from about 2.5 ounces per square yard to about 5.0 ounces per square yard.

* * * * *